US009222299B2

(12) United States Patent
Haak et al.

(10) Patent No.: US 9,222,299 B2
(45) Date of Patent: Dec. 29, 2015

(54) WINDOW FILM ATTACHMENT ARTICLE

(75) Inventors: Christopher A. Haak, Oakdale, MN (US); Ryan B. Prince, St. Paul, MN (US); Mario A. Perez, Burnsville, MN (US); Steven R. Austin, Oakdale, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 1028 days.

(21) Appl. No.: 11/959,072

(22) Filed: Dec. 18, 2007

(65) Prior Publication Data

US 2009/0151255 A1 Jun. 18, 2009

(51) Int. Cl.
*E06B 5/11* (2006.01)
*B29C 65/50* (2006.01)
*B29C 65/00* (2006.01)
*B29L 31/00* (2006.01)
*B29C 65/48* (2006.01)

(52) U.S. Cl.
CPC ............... *E06B 5/11* (2013.01); *B29C 65/4815* (2013.01); *B29C 65/4825* (2013.01); *B29C 65/4835* (2013.01); *B29C 65/5057* (2013.01); *B29C 66/43421* (2013.01); *B29C 66/43441* (2013.01); *B29C 66/47* (2013.01); *B29L 2031/778* (2013.01)

(58) Field of Classification Search
CPC ............... E06B 5/10; E06B 5/11; E06B 5/12; E06B 3/302; B29C 65/5057; B29C 66/43421; B29C 66/43441; B29C 66/47; B29C 65/4815; B29C 65/4825; B29C 65/4835; B29L 2031/778; B60J 1/2094

USPC ............ 52/203, 204.53, 204.54, 204.62, 208, 52/716.1, 716.8, 746.1
See application file for complete search history.

(56) References Cited

U.S. PATENT DOCUMENTS

| 4,075,803 | A | | 2/1978 | Alesi, Jr. |
| 4,184,297 | A | | 1/1980 | Casamayor |
| 4,242,412 | A | | 12/1980 | Funaki et al. |
| 4,540,623 | A | | 9/1985 | Im et al. |
| 4,561,223 | A | * | 12/1985 | Gold et al. ............... 52/202 |
| 4,598,525 | A | * | 7/1986 | Poore ............... 52/204.705 |

(Continued)

FOREIGN PATENT DOCUMENTS

| GB | 2022670 | 12/1979 |
| GB | 2184475 | 6/1987 |

(Continued)

OTHER PUBLICATIONS

Machine translation of Japanese application JP 2001-152635.*

(Continued)

*Primary Examiner* — Joshua J Michener
*Assistant Examiner* — Theodore Adamos
(74) *Attorney, Agent, or Firm* — 3M Innovative Properties Company; Carlos M. Téllez

(57) ABSTRACT

An article for securing a window film to a window frame includes an elongate body having a first end and a second end, a first portion having a first attachment surface extending from the first end to the second end, a connecting portion extending outwardly from the first portion opposite the first attachment surface, and a second portion joined with the end of the connecting portion opposite the first portion. Methods of anchoring an applied window film to a window frame using the article are also disclosed.

17 Claims, 4 Drawing Sheets

(56) References Cited

U.S. PATENT DOCUMENTS

| | | |
|---|---|---|
| 5,426,897 A | 6/1995 | Gazaway |
| 5,427,842 A | 6/1995 | Bland et al. |
| 5,553,422 A | 9/1996 | Gazaway |
| D393,083 S * | 3/1998 | Caltrider .................. D25/199 |
| 5,778,629 A | 7/1998 | Howes |
| 5,937,611 A | 8/1999 | Howes |
| 5,992,107 A * | 11/1999 | Poirier ......................... 52/203 |
| 6,040,061 A | 3/2000 | Bland et al. |
| 6,082,062 A | 7/2000 | Alflen |
| 6,101,783 A | 8/2000 | Howes |
| 6,108,999 A | 8/2000 | Smith et al. |
| 6,367,210 B1 * | 4/2002 | Trundle ..................... 52/204.5 |
| 6,715,245 B2 * | 4/2004 | Lewkowitz ................. 52/208 |
| 6,832,457 B2 * | 12/2004 | Geiger ....................... 52/656.5 |
| 6,912,817 B1 * | 7/2005 | Sabac et al. ............... 52/204.54 |
| 6,931,799 B2 | 8/2005 | Webb |
| 7,204,901 B2 | 4/2007 | Bayha et al. |
| 2005/0129395 A1 * | 6/2005 | Sabac et al. ................ 396/517 |

FOREIGN PATENT DOCUMENTS

| | | | |
|---|---|---|---|
| JP | 05-087140 | | 11/1993 |
| JP | 2001152635 A | * | 6/2001 |
| JP | 2005-207226 | | 4/2005 |
| WO | WO 98/59143 | | 12/1998 |
| WO | WO 02/088504 A1 | | 11/2002 |

OTHER PUBLICATIONS

Definition of "line" from thefreedictionary.com; http://www.thefreedictionary.com/line.*

* cited by examiner

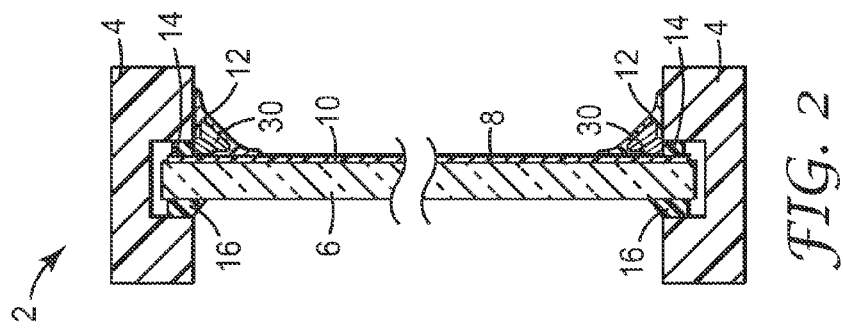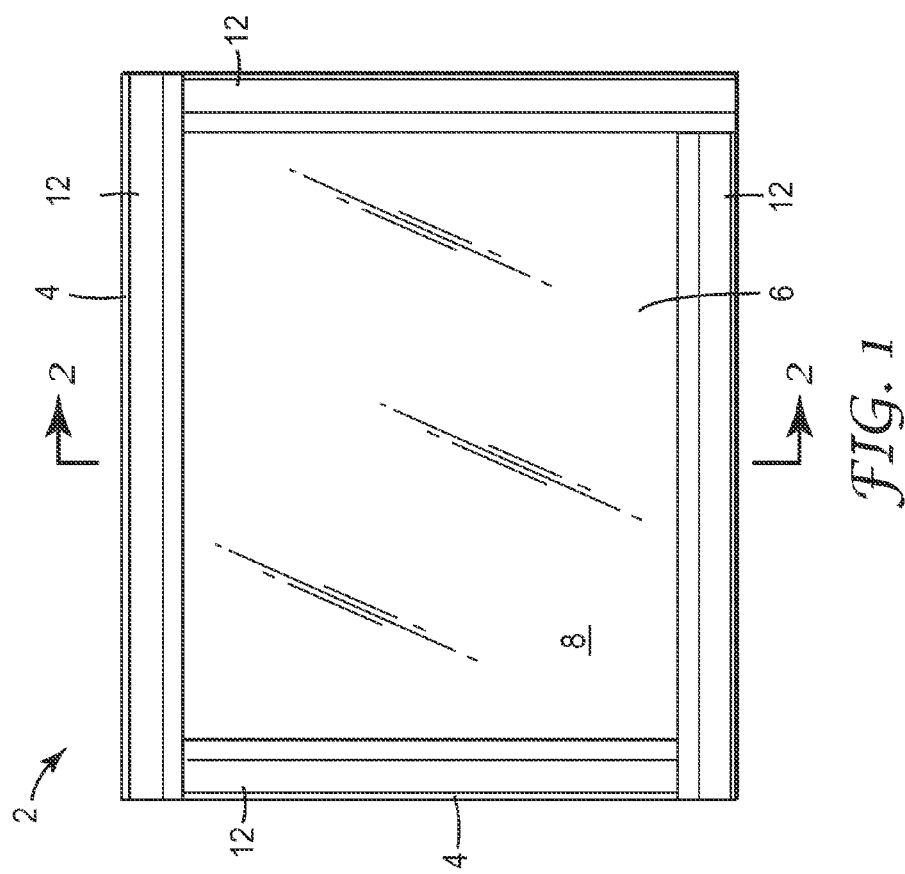

WINDOW FILM ATTACHMENT ARTICLE

BACKGROUND

The present invention relates generally to windows and, more particularly, to an impact resistant window assembly that utilizes window film applied to the window glass.

Window films are commonly applied to ordinary window glass, such as, for example, to existing windows in commercial buildings or residences, to enhance the impact resistance and other properties of the window. Such window films are available from 3M Company, St. Paul, Minn., under the trade designation 3M SCOTCHSHIELD Ultra Safety and Security window film. Such window films provide protection against, for example, natural events, such as hurricanes and earthquakes, and man made events such as explosions, and "smash-and-grab" burglaries.

Window films are adhesively bonded to the window glass, and the edge of the window film is secured to the window frame using a silicone sealant. The silicone sealant is applied along the edge of the window film and along the adjacent edge portion of the window frame. In the event of an impact to the window glass, the window film holds the shattered glass in place. That is, the shattered shards of glass remain generally adhered to the window film after the impact. The silicone sealant, in turn, serves to hold the window film and the adhered shattered glass to the window frame. By retaining the shattered glass in the window opening, the window film reduces the potential for flying glass to cause injuries to occupants of the building, and also prevents wind and rain from entering and damaging the interior of the structure.

Articles for securing window films to a window frame are known in the prior art. U.S. Pat. No. 5,992,107 (Poirier), for example, discloses a method and apparatus for edge mounting security window film in a window frame. U.S. Pat. No. 6,931,799 (Webb) discloses an anchoring profile for securing a pane mounted in a frame and protected against impact by window film.

SUMMARY

The industry is always seeking improved impact resistant window constructions, and improved articles and methods for more securely attaching window film to a window frame. There is a continuing need for improved impact resistant window constructions utilizing window film applied to the window glass that provide improved protection against impact, are cost effective, and can be installed more quickly and easily. The present invention provides an improved article for securing a window film to a window frame, and an improved impact resistant window film assembly that exhibits improved impact performance.

In one embodiment, the present invention provides an attachment article for securing a window film to a window frame. The attachment article may comprise a body having a first portion including a first attachment surface, a second portion including a second attachment surface, and a connecting portion arranged between the first portion and the second portion. The first portion may include a heel portion extending toward the second portion, and the heel portion may be arranged in spaced relation with the second portion and the connecting portion. In addition, the heel portion may include at least a portion of the first attachment surface.

In another aspect, the first portion may include first and second edges, first and second ends, and the first attachment surface may extend from the first end to the second end between the first and second edges.

In another aspect, the first portion may include a central region contiguous with the connecting portion, and the heel portion may extend from the central region to the first portion second edge. In another aspect, the first portion may include a toe portion extending from the central region to the first edge. In a more specific aspect, the heel portion may include a back surface opposite the first attachment surface that extends from the connecting portion to the first portion second edge.

In one embodiment, the first attachment surface may comprise a first adhesive surface. The first adhesive surface may be provided by, for example, a double sided adhesive tape, a pressure sensitive adhesive, caulk, adhesive sealants, or the like.

In another embodiment, the second portion may include first and second edges, first and second ends, and the second attachment surface may extend from the first end to the second end between the first and second edges. The second attachment surface may comprise a second adhesive surface, which may be provided by, for example, a double sided adhesive tape, a pressure sensitive adhesive, caulk, adhesive sealants, or the like.

In a more specific embodiment, the second portion may include a toe portion adjacent the first edge, a central region extending from the toe portion contiguous with the connecting portion, and a heel portion extending from the central region to the second edge.

In one embodiment, the first and second attachment surfaces may lie in generally parallel planes. In another embodiment, the first and second attachment surfaces may lie in generally perpendicular planes.

In various aspects, the body may be elongate, have a uniform cross section, be symmetric, have a unitary or single piece construction, and/or be flexible and formed of a rubber material such as ethylene propylene diene monomer (EPDM).

In another aspect, the present invention provides an impact-resistant window assembly comprising a window frame, glazing having opposed major surfaces arranged within the window frame, window film arranged on at least one of the glazing opposed major surfaces, and an article for securing at least a portion of the perimeter of the window film to the window frame. The article may comprise an elongate body having a first end and a second end, a first portion having a first attachment surface adhesively bonded to at least one of the window frame and the window film, a connecting portion extending outwardly from the first portion opposite the first attachment surface, and a second portion joined with the end of the connecting portion opposite the first portion, and the second portion may have a second attachment surface adhesively bonded to the other of the window frame and the window film.

In yet another aspect, the present invention provides an article for securing a window film to a window frame comprising an elongate body comprising a first portion having a first attachment surface, a connecting portion extending outwardly from a region of the first portion opposite the first attachment surface, and a second portion joined with the end of the connecting portion opposite the first portion.

Advantages of certain embodiments of the invention include providing an attachment article for securing a window film to a window frame having improved impact resistance, bonds securely to the window film and window frame, is easy to manufacture, is easy to install and difficult to install improperly, and has a pleasing appearance.

BRIEF DESCRIPTION OF THE DRAWINGS

The present invention will be further described with reference to the accompanying drawings, in which:

FIG. 1 is a front plan view of an impact resistant window assembly including an attachment article for securing a window film to a window frame according to one aspect of the invention;

FIG. 2 is a cross sectional view taken along line 2-2 of FIG. 1;

FIG. 3b is a cross sectional view taken along line 3b-3b of FIG. 3a;

FIG. 5b is cross sectional view taken along line 5b-5b of FIG. 5a.

DETAILED DESCRIPTION

Figure 3A:
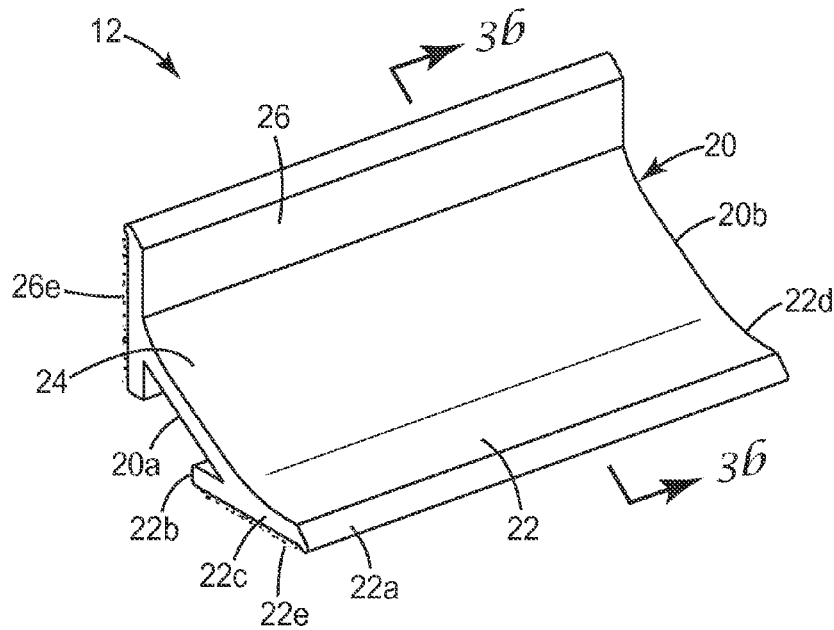
FIG. 3a is a detailed perspective view of the attachment article of FIGS. 1 and 2.

Referring now to the drawings, wherein like reference numerals refer to like or corresponding parts throughout, FIGS. 1 and 2 show an impact resistant window assembly 2 generally including a window frame 4, a pane of window glass or glazing 6 arranged within the window frame 4, window film 8 applied to the interior surface 10 of the glazing 6, and attachment articles 12 applied to the perimeter of the window film 8 and to adjacent edges of the window frame 4, thereby securing the window film 8 to the window frame 4.

Interior and exterior gaskets 14, 16 (FIG. 2), respectively, are provided between the edges of the glazing 6 and the window frame 4 to create a tight seal with the glazing 6, and to secure the glazing 6 within the window frame 4. FIGS. 1 and 2 are intended to represent a commercial window assembly, such as would be found in, for example, a commercial office building.

The window frame 4 may be constructed from conventional materials such as wood, synthetic plastic materials, composites, or metals, such as aluminum. In addition, such materials may be painted with, for example, an acrylic, latex or oil paint, or may include other coatings such as urethanes, epoxies or lacquers. The glazing 6 is shown generically as a single pane of glass, but the glazing 6 may comprise insulated glass units (IGUs), laminated glass, wire-glass, or other window glass constructions.

The particular window film 8 applied to the glazing 6 is not significant to the presently described invention, so long as it provides the desired level of impact resistance for the window assembly 2. Suitable window films include puncture and tear resistant films formed of, for example, one or more layers of a tough durable material, such as polyester. Suitable window films may optionally include an acrylic abrasion resistant coating, UV absorbers for blocking UV radiation, and/or coatings for reducing solar heat gain.

Suitable window films are described in, for example, U.S. Pat. No. 5,427,842 (Bland et. al.), U.S. Pat. No. 6,040,061 (Bland et. al.), and U.S. Pat. No. 4,540,623 (Im et. al.), the contents of which are hereby incorporated herein in their entirety. Suitable window films are commercially available from 3M Company, St. Paul, Minn. under the trade designation SCOTCHSHIELD Ultra Safety and Security Window Films. A specific SCOTCHSHIELD Ultra Safety and Security Window Film is the SH14CLARL window film. This window film may further be provided with solar control capability for reducing solar heat gain.

The window film 8 is adhesively bonded to the interior surface of the glazing 6 in a manner known to those skilled in the art. Because the window film 8 is adhesively bonded to the glazing 6, if the glazing 6 is broken, the shattered glass will generally remain adhered to the window film 8.

As illustrated in FIG. 1, attachment articles 12 may be applied to an edge portion of the window film 8 along at least a portion of the perimeter of the window film 8, and to an adjacent edge portion of the window frame 4. The attachment articles 12 are applied so that they bond to both the window film 8 and the window frame 4, thereby bonding the window film 8 to the window frame 4. By attaching the attachment articles 12 in this manner—in the event of an impact—the attachment articles 12 form a strong bond that serves to anchor the window film 8 to the window frame 4, such that the window film 8, including the shattered window glass affixed to the window film 8, will remain in place in the window opening.

To form a suitably secure bond between the window frame 4 and the window film 8, it is desirable that each attachment article 12 be capable of forming a secure bond with both the window frame 4 and the window film 8. In addition, the attachment article 12 will have adequate cohesive strength to withstand the forces generally associated with the impacts for which it is designed.

It is also desirable for the attachment article 12 to have suitable environmental durability characteristics including resistance to thermal and ultraviolet degradation, resistance to cleaning solvents and liquids, and resistance to plasticizers or other additives that may be present in the glazing gaskets or frame material. Other desirable properties of the attachment article 12 include desirable aesthetic properties such as gloss, lack of chalking, and general appearance.

Figure 3B:
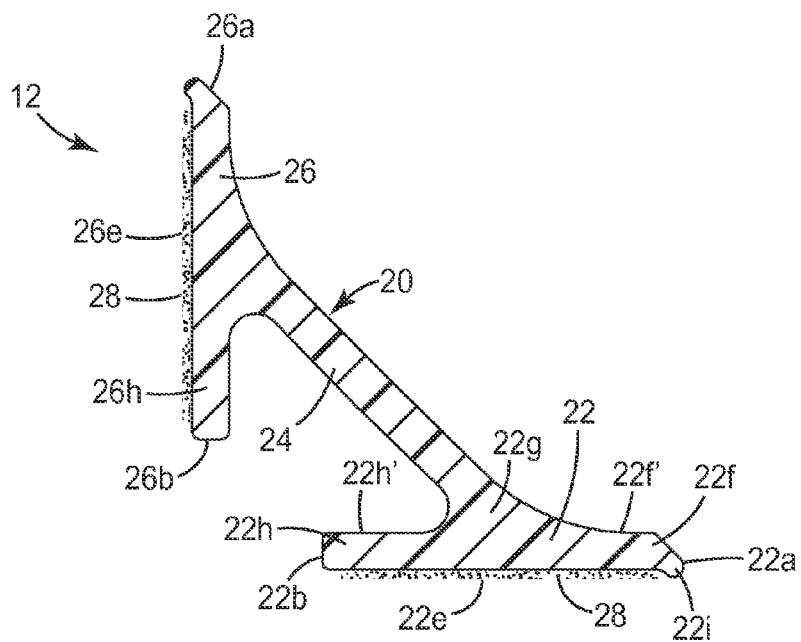

As shown in FIGS. 3a and 3b, the attachment article 12 includes an elongate body 20 having a first end 20a, a second end 20b. The elongate body 20 includes a first portion 22, a connecting portion 24, and a second portion 26, each of which extend from the first end 20a to the second end 20b. In the illustrated embodiment, the attachment article 12 has a unitary or single piece construction, but it may also be constructed of two or more individual pieces that are assembled, or it may be co-extruded for added functionality.

The elongate body 20 may be flexible. Suitable materials for the elongate body 20 include energy dissipating materials such as elastomers, thermoplastic and thermosetting polymers, foams, composites of such materials further including, for example, fillers or reinforcing fibers, and laminates and combinations thereof. A particularly suitable material is rubber such as, for example, ethylene propylene diene monomer (EPDM). The elongate body 20 may also be inflexible, and formed of materials such as synthetic plastic materials, wood, or metal.

In the illustrated embodiment, the elongate body 20 has a uniform cross section. That is, the cross section of the elongate body 20 does not change along the length of its longitudinal axis. The elongate body 20 may be provided in the form of discrete segments having predetermined lengths, or in the form of a continuous length (e.g. in the form of a roll) from which attachment articles 12 having the desired lengths may be cut. The discrete segments may have a longitudinal dimension ranging from, for example, one inch (1 inch) to six inches (6 inches) or more. Such discrete segments may be placed at selected locations of the window assembly 2, thereby securing the perimeter of the window film 8 to the window frame 4. Alternatively, as shown in FIG. 1, the elongate body 20 may be cut from a continuous length to an appropriate length that allows attachment articles 12 to be applied along the entire perimeter of the window film 8 adjacent the window frame 4.

The first portion 22 of the elongate body 20 includes a first edge 22a, a second edge 22b, a first end 22c, a second end 22d, and a first attachment surface 22e that extends from the first end 22c to the second end 22d between the first and second edges 22a, 22b.

The first portion 22 will now be described in detail. Because the second portion 26 in the illustrated embodiment is identical to first portion 22, rather than repeating the description for the second portion 26, the following description will be understood to refer to both the first portion 22 and the second portion 26.

Referring to FIG. 3b, the first portion 22 may include an optional toe portion 22f adjacent the first edge 22a, a central region 22g extending from the toe portion 22f contiguous with the connecting portion 24, and a heel portion 22h extending from the central region 22g to the second edge 22b. The connecting portion 24 extends outwardly from the first portion 22 in a direction opposite the first attachment surface 22e toward the second portion 26. The second portion 26 is joined with the end of the connecting portion 24 opposite the first portion 22.

In the illustrated embodiment, the toe portion 22f includes a back surface 22f' opposite the first attachment surface 22e that extends from the first portion 22 first edge 22a to the connecting portion 24. The heel portion 22h includes a back surface 22h' opposite the first attachment surface 22e that extends from the connecting portion 24 to the first portion 22 second edge 22b. In this manner, the connecting portion 24 adjoins the first portion 22 in a region intermediate the first and second edges 22a, 22b, and between the toe portion back surface 22f' and the heel portion back surface 22h'. That is, the connecting portion 24 adjoins the central region 22g of the first portion 22, and the toe and heel portions 22f, 22h, which extend outwardly in opposite directions from the central region 22g, do not adjoin the central region 22g. In another embodiment, the toe portion 22f may be omitted, whereby the first portion 22 includes a heel portion 22h only.

While not wishing to be bound by theory, it is believed that by having the connecting portion 24 adjoining the central region 22g of the first portion 22—and not with the heel portion 22h of the first portion 22—the force placed on the first portion 22 of the attachment article 12 in the event of an impact to the glazing 6 is in the form of a shear force and/or a tensile force, and not in the form of a peel force. Because adhesive bonds are generally able to withstand shear and/or tensile forces better than peel forces, the attachment article 12 is generally able to withstand greater impact forces to the glazing 6. That is, because of the shape of the attachment article 12, and because of the ability of the shape to impart shear and/or tensile forces to the first portion 22 of the elongate body 20, the attachment article 12 provides a more secure attachment of the glazing 6/window film 8 unit to the window frame 4.

Stated another way, the attachment article 12 includes a surface having a leading edge adjacent the window frame 4 and a trailing edge remote from the leading edge. This surface includes an attachment surface 22e having a bond line. The geometry of the attachment article 12 creates a load bearing connection point to the window frame 4 that does not occur at the leading edge of the bond line. That is, the load bearing connection point is offset from the leading edge of the attachment surface in the direction of the trailing edge such that the force is directed to the attachment surface in a region between the leading and trailing edges. In this manner, when the attachment article 12 experiences a load, the force placed on the attachment surface 22e does not occur at the leading edge of the attachment surface. Consequently, the force placed on the attachment surface 22e is a tensile force rather than a peel force.

In the illustrated embodiment, the first portion 22 includes a shroud portion 22i adjacent the first edge 22a. The shroud portion 22i extends beyond the plane of the attachment surface 22e, and thereby serves to conceal the edge of the adhesive surface 28, which would otherwise be exposed. In this manner, the shroud 22i creates a more finished and aesthetically pleasing attachment interface with the adjacent surface.

In the illustrated embodiment, the attachment article 12 has a symmetric profile. That is, the cross-sectional view shown in FIG. 3b is symmetric and the first and second portions 22, 26 are identical. An advantage of a symmetric profile is that the attachment article 12 cannot be installed upside down or backwards. That is, regardless of how an end user applies the attachment article 12 to the window assembly 2, the attachment article 12 will be oriented properly.

In the illustrated embodiment, both the first and second portions 22, 26 of the attachment article 12 include a heel portion 22h, 26h respectively. That is, referring to FIGS. 3a and 3b, the second portion 26 may include a heel portion 26h—similar to heel portion 22h—extending beyond the region where the second portion 26 is joined with the connecting portion 24.

By providing both the first and second portions 22, 26 with a heel portion 22h, 26h, the overall performance of the attachment article 12 may be improved. In addition, by providing the first and second portions 22, 26 with a heel portion 22h, 26h, the performance benefits offered by the heel portion (i.e. the ability of attachment article 12 to withstand forces generated by an impact to the glazing 6 in a shear and/or tensile mode rather than a peel mode as described above) is achieved regardless of whether the first portion 22 is affixed to the window frame 4 and the second portion 26 is affixed to the window film 8, or vice versa.

Thus, by making the attachment article 12 symmetric, or at least by providing both the first and second portions 22, 26 with a heel portion 22h, 26h, the possibility of an end user improperly installing the attachment article 12 may be reduced.

In the illustrated embodiment, the first and second portions 22, 26 include attachment surfaces 22e, 26e that comprise adhesive surfaces 28. The adhesive surfaces 28 may be provided, for example, by a double sided adhesive tape, a pressure sensitive adhesive, a hot melt or heat activated adhesive coated directly on to the first and/or second attachment surfaces 22e, 26e.

A suitable double sided adhesive tape is an acrylic foam tape, such as the acrylic foam tape available from 3M Company, St. Paul, Minn., under the trade designation 3M VHB acrylic foam tape. The double sided adhesive tape may be pre-attached to the first and/or second attachment surfaces 22e, 26e, or the double sided adhesive tape may be provided separately and applied to the first and/or second attachment surfaces 22e, 26e when the attachment article 12 is used to secure the window film 8 to the window frame 4.

The first and/or second attachment surfaces 22e, 26e may also be adhesively bonded to the window film 8 and window frame 4 using, for example, glue, adhesive caulks and sealants, or the like, or by heat bonding. Suitable sealants include, for example, silicone based sealants such as Dow Corning 995 Silicone Structural Sealant, polyether based sealants such as 3M Marine Adhesive Sealant Fast Cure 4000 UV (Part No. 06580, 3M#60-9800-4288-5), or urethane based sealants such as 3M Auto Glass Urethane Windshield Adhesive—Medium Viscosity (Part No. 08693, 3M#60-9800-2405-7).

As illustrated in FIG. 2, the gap 30 between the attachment article 12 and the window film 8 may optionally be filled with such sealants to further enhance the bond between the attachment article 12 and the respective surfaces of the window frame 4 and window film 8, thereby further enhancing the impact resistance of the window assembly 2.

In certain embodiments, the adhesive surfaces 28 may have an edge to edge dimension (i.e. from the first edge 22a, 26a to the second edge 22b, 26b, respectively) of at least about ⅛ inch or at least about ¼ inch to no greater than about 1 inch or no greater than about ¾ of an inch.

In the embodiment illustrated in FIGS. 1-3, the first portion 22 and second portion 26 are arranged to form a 90 degree angle, such that the first 22e and second 26e attachment surfaces lie in generally perpendicular planes. This configuration is useful in applications, such as the configuration illustrated in FIG. 2, where the window frame 4 includes a flat ledge arranged at a 90 degree angle to the window film 8 to which the attachment article 12 may be bonded. This configuration is common in commercial buildings.

Figure 4:
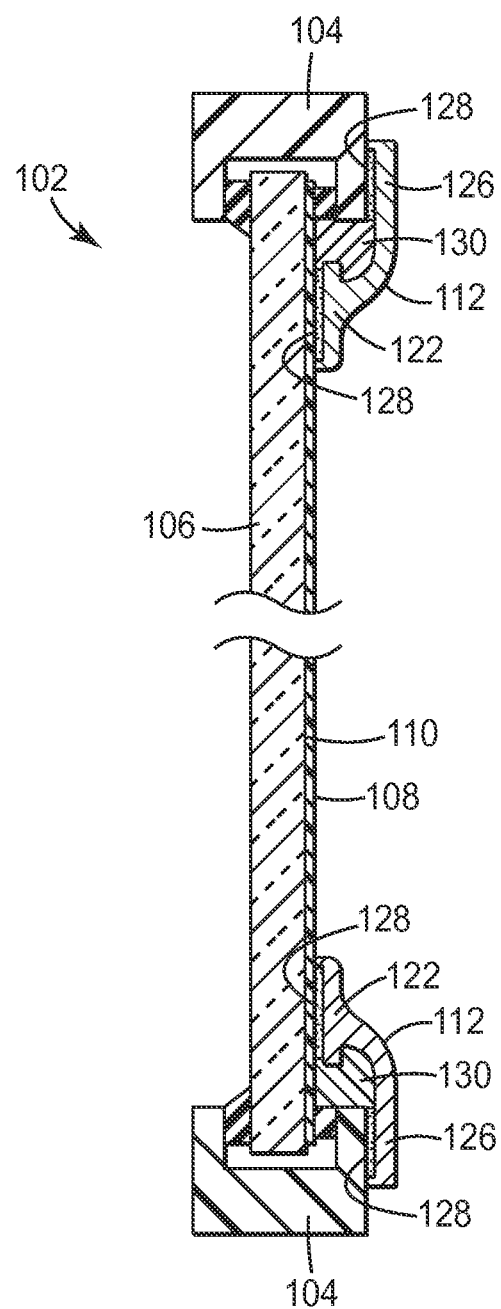
FIG. 4 is a cross sectional view of a window film assembly including an attachment article according to an alternate embodiment of the invention.

Referring now to FIGS. 4 and 5, wherein functionally similar features to those shown in FIGS. 1-3 are referred to with like reference numerals incremented by 100, there is shown an impact resistant window assembly 102 generally including a window frame 104, a pane of window glass or glazing 106 arranged within the window frame 104, window film 108 applied to the interior surface 110 of the glazing 106, and an alternate embodiment of an attachment article 112 for securing the window film 108 to the window frame 104. FIGS. 4 and 5 are intended to represent a residential window assembly, such as would be found in, for example, a home. Although the attachment article 112 is described in greater detail below, in one respect, the attachment article 112 illustrated in FIGS. 4 and 5 differs from the attachment article 12 shown in FIGS. 1-3 in that the adhesive surfaces 128 face in the same direction and are arranged in generally parallel planes.

Figure 5A:
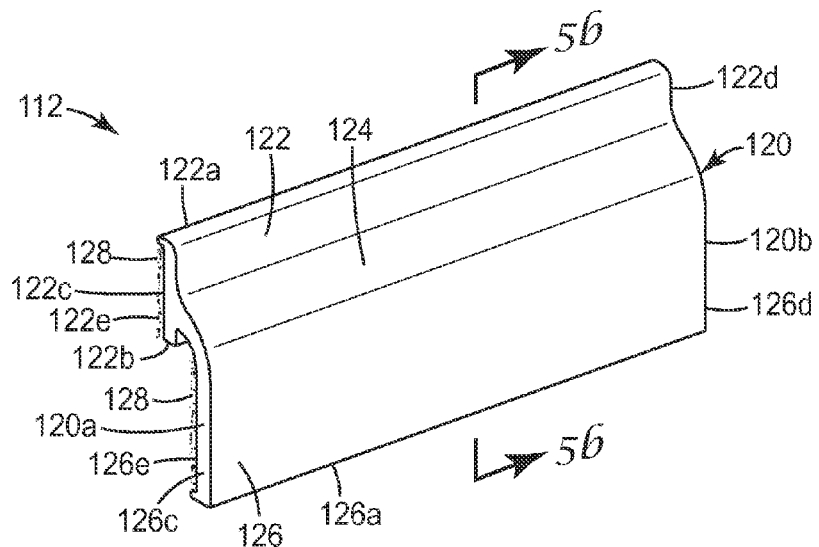
FIG. 5a is a detailed perspective view of the attachment article of FIG. 4.
Figure 5B:
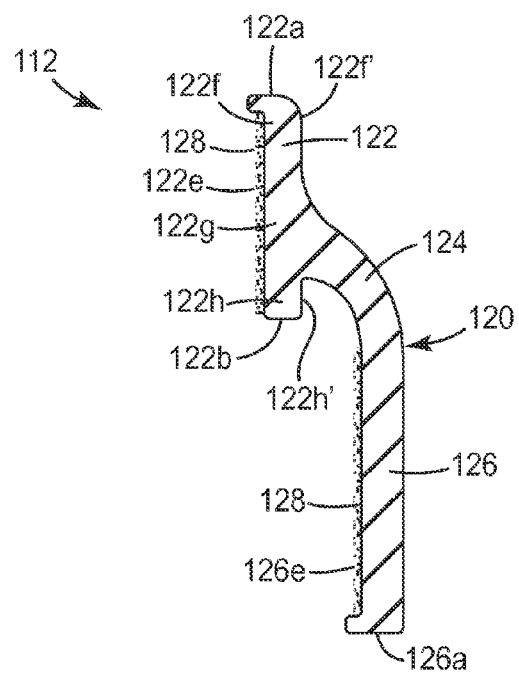

As shown in FIGS. 5a and 5b, the attachment article 112 includes an elongate body 120 having a first end 120a, a second end 120b, and a first portion 122, a connecting portion 124, and a second portion 126 each extending from the first end 120a to the second end 120b.

The first portion 122 is similar to the first portion 22 illustrated in FIGS. 1-3 and includes a first edge 122a, a second edge 122b, a first end 122c, a second end 122d, and a first attachment surface 122e that extends from the first end 122c to the second end 122d between the first and second edges 122a, 122b.

Referring to FIG. 5b, the first portion 122 includes an optional toe portion 122f adjacent the first edge 122a, a central region 122g extending from the toe portion 122f contiguous with the connecting portion 124, and a heel portion 122h extending from the central region 122g to the second edge 122b. The connecting portion 124 extends outwardly from the first portion 122 generally opposite the first attachment surface 122e, and the second portion 126 is joined with the end of the connecting portion 124 opposite the first portion 122.

In the illustrated embodiment, the toe portion 122f includes a back surface 122f' opposite the first attachment surface 122e that extends from the first portion 122 first edge 122a to the connecting portion 124. The heel portion 122h includes a back surface 122h' opposite the first attachment surface 122e that extends from the connecting portion 124 to the first portion 122 second edge 122b. In this manner, the connecting portion 124 adjoins the first portion 122 in a region intermediate the first and second edges 122a, 122b, and between the toe portion back surface 122f' and the heel portion back surface 122h'. That is, the connecting portion 124 adjoins the central region 122g of the first portion 122, and the toe and heel portions 122f, 122h, which extend outwardly in opposite directions from the central region 122g, do not adjoin the central region 122g. In another embodiment, the toe portion 122f may be omitted, whereby the first portion 122 includes a heel portion 122f only.

It has been found that by providing an the attachment article 112 having a first portion 122 with a toe portion 122f, a central region 122g, and a heel portion 122h, the attachment article 112 is better able to withstand impact forces to the glazing 106, and thereby provides a more secure attachment of the glazing 106/window film 108 unit to the window frame 104.

As shown in FIG. 5a, the second portion 126 extends from the connecting portion 124 to a position offset from the first portion 122, and includes a first edge 126a, a first end 126c, a second end 126d, and a second attachment surface 126e that extends from the first end 126c to the second end 126d between the first edge 126a and the connecting portion 124.

The first and second attachment surfaces 122e, 126e comprise adhesive surfaces 128, which may be similar to those described above with reference to FIGS. 1-3. In the embodiment illustrated in FIGS. 4 and 5, the adhesive surfaces 128 face the same direction and lie in off-set generally parallel planes. This configuration is useful in applications, such as the configuration illustrated in FIG. 4, where the window frame 104 is narrow and the side of the window frame 104 provides an attachment surface that is generally parallel to the glazing 106, whereby the window film 108 is more easily secured to the side of the window frame 104 than to the ledge of the window frame as illustrated in FIG. 2.

This configuration is common in residential window constructions. In this configuration, the first portion 122 of the attachment article 112 is bonded to the window film 108, and the second portion 126 of the attachment article 112 is bonded to the side of window frame 104. Such a configuration provides an attachment mechanism for residential window assemblies that is able to withstand forces generated by an impact to the window in a shear or tensile mode (rather than a peel mode), thereby increasing the impact resistance of the window assembly, and which also has a low profile that is unobtrusive and therefore more aesthetically pleasing.

The gap 130 between the attachment article 112 and the window film 108 may optionally be filled with such sealants as described above in reference to FIG. 2 to further enhance the bond between the attachment article 112 and the respective surfaces of the window frame 104 and window film 108, thereby further enhancing the impact resistance of the window assembly 102.

Persons of ordinary skill in the art may appreciate that various changes and modifications may be made to the invention described above without deviating from the inventive concept. For example, the attachment article may be modified to have attachment surfaces that match the angles of window assemblies which differ from those described therein. In addition, the attachment article may be fabricated in, for example, the form of a 90 degree corner piece to facilitate the installation of the attachment article in the corners of the window assembly. Thus, the scope of the present invention should not be limited to the structures described in this application, but only by the structures described by the language of the claims and the equivalents of those structures.

What is claimed is:

1. An article comprising a body having
   a first portion including a first attachment surface having a straight bond line,
   a second portion including a second attachment surface,
   a connecting portion arranged between and connecting the first portion and the second portion, wherein the connecting portion comprises a linear portion that terminates at or near a midpoint of the first attachment surface and the second attachment surface, and wherein the first portion includes a heel portion extending toward the second portion, and arranged in spaced relation with the second portion and the connecting portion, and further wherein the heel portion includes at least a portion of the first attachment surface, and wherein the article comprises an attachment article for securing a window film to a window frame.

2. An article as defined in claim 1, wherein the first portion includes first and second edges, first and second ends, and the first attachment surface extends from the first end to the second end between the first and second edges.

3. An article as defined in claim 2, wherein the first portion includes a central region contiguous with the connecting portion, and the heel portion extends from the central region to the first portion second edge.

4. An article as defined in claim 3, wherein the first portion further includes a toe portion extending from the central region to the first edge.

5. An article as defined in claim 4, wherein the heel portion includes a back surface opposite the first attachment surface that extends from the connecting portion to the first portion second edge.

6. An article as defined in claim 1, wherein the first attachment surface comprises a first adhesive surface.

7. An article as defined in claim 6, wherein the first adhesive surface is provided by a double sided adhesive tape.

8. An article as defined in claim 1, wherein the second portion includes first and second edges, first and second ends, and the second attachment surface extends from the first end to the second end between the first and second edges.

9. An article as defined in claim 8, wherein the second attachment surface comprises a second adhesive surface.

10. An article as defined in claim 9, wherein the second adhesive surface is provided by a double sided adhesive tape.

11. An article as defined in claim 10, wherein the second portion includes a toe portion adjacent the first edge, a central region extending from the toe portion contiguous with the connecting portion, and a heel portion extending from the central region to the second edge.

12. An article as defined in claim 1, wherein the first and second attachment surfaces lie in generally perpendicular planes.

13. An article as defined in claim 1, wherein the body is flexible.

14. An article as defined in claim 1, wherein the body is elongate and has a uniform cross section.

15. An article as defined in claim 1, wherein the body is symmetric.

16. An article as defined in claim 1, wherein the body has a unitary construction.

17. An article comprising an elongate body having
   a first portion having a first attachment surface having a straight bond line,
   a connecting portion extending outwardly from a region of the first portion opposite the first attachment surface, wherein the connecting portion comprises a curved portion with a radius of curvature, and
   a second portion joined with the end of the connecting portion opposite the first portion the second portion having a second attachment surface having a straight bond line, wherein the first attachment surface and the second attachment surface lie in generally parallel, and wherein the article comprises an article for securing a window film to a window frame.

\* \* \* \* \*

UNITED STATES PATENT AND TRADEMARK OFFICE
CERTIFICATE OF CORRECTION

Page 1 of 1

PATENT NO. : 9,222,299 B2
APPLICATION NO. : 11/959072
DATED : December 29, 2015
INVENTOR(S) : Christopher Haak It is certified that error appears in the above-identified patent and that said Letters Patent is hereby corrected as shown below:

Specification

Column 5
Line 32            Delete "22f" and insert -- 22f --, therefor.

Column 8
Line 12            Delete "an the" and insert -- an --, therefor.

Claims

Column 10
Line 34 (Approx.)  In Claim 17, delete "parallel," and insert -- parallel planes, --, therefor.

Signed and Sealed this
Tenth Day of May, 2016

Michelle K. Lee
*Director of the United States Patent and Trademark Office*